2,862,964

PROCESS FOR PRODUCING MONOCHLORO ACETYL CHLORIDE

Richard Norman Lacey, Hull, England, assignor to The Distillers Company Limited, Edinburgh, Scotland, a British company No Drawing. Application June 22, 1956
Serial No. 593,062

Claims priority, application Great Britain July 12, 1955

6 Claims. (Cl. 260—544)

The present invention relates to the production of chloro-acetyl chloride by the liquid phase chlorination of ketene. An object of the invention is to provide a process which, while capable of giving high yields of the desired product with little or no production of dichloro-acetyl chloride, can be carried out on an industrial scale without undue hazard.

It is already known that ketene will react with chlorine in ether to produce chloroacetyl chloride. However, ether is a moist undesirable diluent to use on a large scale owing to its high volatility which leads to considerable losses, and constitutes a great fire risk. Replacement of the ether by other solvents, however, generally leads to the formation of dichloroacetyl chloride. Since this contaminant is very difficult to separate from the monochlor compound, and since, unlike the latter which is an intermediate used in the pharmaceutical and dyestuffs industries, the dichlor compound is not of commercial value, such solvents are not satisfactory.

According to the present invention, the process for the production of chloroacetyl chloride comprises interacting chlorine and ketene in the liquid phase in an alkyl acetate.

While the reaction will proceed at any temperature below the boiling point of the alkyl acetate used as diluent, it is preferred that the temperature should not be above 50° C. and preferably not above 30° C. The reaction is exothermic and accordingly, although temperatures below room temperature may be used, the most satisfactory temperatures are in the range 20° C. to 30° C. Such temperatures can readily be maintained by circulating cooling water through a coil in the reactor.

Of the alkyl acetates which may be used as diluents, the amyl and lower acetates are preferred. The highest yields of chloro-acetyl chloride, and the lowest yields of the dichlor compound, are obtained by the use of ethyl or methyl acetate. A characteristic of the use of alkyl acetates as diluents in the process of the invention is that they are not entirely inert, which may in part explain their beneficial effect on the reaction. The extent to which the diluent enters into reaction depends on the relative proportions of the chlorine and the ketene and on other reaction conditions.

A by-product of the reaction is acetyl chloride and in an important embodiment of the invention the acetyl chloride, after separation from the chloroacetyl chloride is reacted with an alcohol. Thus if ethyl acetate is being used as the diluent, the formed chloroacetyl chloride is separated from the acetyl chloride and ethyl acetate, and the theoretical quantity of ethanol is allowed to react with the acetyl chloride to form further ethyl acetate. The amount of acetyl chloride formed is almost invariably more than enough to make up for losses of ethyl acetate, and this procedure obviates the necessity for separating the acetyl chloride from the diluent.

The alkyl acetate diluent should be employed in an amount sufficient to give a ratio of the diluent to the total reaction mixture of at least 0.4 to 1 and preferably from 0.5 to 1 to 0.7 to 1, by volume if freedom of the product from the dichlor compound is desired while maintaining high yields of the desired product.

The chlorine and ketene are preferably employed in such proportions that there is a molar excess of chlorine in order to ensure that all the ketene reacts. Since it is often difficult to control the flow of ketene within close limits, it is convenient to employ a moderate molar excess of chlorine, for instance a 10–20% molar excess. In the process of the invention it has been found that chloroacetyl chloride free from the dichlor- compound can be produced with molar excesses of chlorine as high as 25–30%, while even a 35–40% molar excess gives a product containing only 1–2% of this contaminant.

The products of the reaction may be separated by fractional distillation, under reduced pressure for the higher boiling products including the chloroacetyl chloride. A kettle temperature of 130° C. should not be exceeded.

The following examples show how the invention may be carried out in practice:

EXAMPLES 1 TO 10

Ketene, generated by the pyrolysis of diketene, was reacted with chlorine in a continuous manner in the presence of various diluents. The reactions were carried out in a glass reactor provided with two gas inlets below the liquid level, a feed point for the diluent, a stirrer, a cooling coil, a gas exit via a reflux condenser and a run-off point for continuous overflow of the product. In the examples where methyl acetate was used as diluent, the reaction product was distilled to recover a combined methyl acetate-acetyl chloride fraction followed by chloroacetyl chloride forerunnings, the pressure then being lowered to recover the main chloroacetyl chloride fraction at a pressure of 100 mm. of mercury until the kettle temperature reached 130° C. The crude chloroacetyl chloride was then refractionated. In the examples where ethyl or isoamyl acetate was used as diluent, the acetyl chloride and ester forerunnings were taken off at atmospheric pressure, followed by vacuum distillation to remove ester and chloroacetyl chloride from any high boilers as a combined fraction. The chloroacetyl chloride was then refractionated.

Table

| Ex. No. | Diluent | Reaction temp. (°C.) | Diluent: Total reaction product | Ketene feed rate (moles/hour) | Cl₂ feed (percent molecular excess) | Yield chloroacetyl chloride +dichlor cpd. (percent theory on ketene) | Yield acetyl chloride (percent theory on ketene) | Dichlor cpd. content of chloroacetyl chloride (percent by weight) |
|---|---|---|---|---|---|---|---|---|
| 1 | Methyl acetate | 32 | 0.54:1 | 2.29 | 10.6 | 78.3 | 24.7 | Nil |
| 2 | do | 23 | 0.56:1 | 1.38 | 23.0 | 81.6 | 20.0 | Nil |
| 3 | do¹ | 27 | 0.57:1 | 1.48 | 38.0 | 82.0 | 23.8 | 1.7 |
| 4 | Ethyl acetate | 30 | 0.51:1 | 2.53 | 2.0 | 80.2 | 14.5 | Nil |
| 5 | do | 27 | 0.52:1 | 1.81 | 3.0 | 86.2 | 16.7 | Nil |
| 6 | do | 25 | 0.55:1 | 1.52 | 27.6 | 75.6 | 27.3 | Nil |
| 7 | do | 26 | 0.38:1 | 2.10 | 22.0 | 83.6 | 18.5 | 2.8 |
| 8 | do | 35 | 0.48:1 | 2.00 | 26.5 | 74.3 | 28.0 | Nil |
| 9 | do | 50 | 0.51:1 | 2.16 | 19.0 | 69.6 | 31.1 | Nil |
| 10 | Isoamyl acetate | 30 | 0.59:1 | 1.88 | 22.0 | 66.7 | 29.3 | 2.8 |

¹ Example No. 3 was carried out using methyl acetate prepared by adding the theoretical quantity of methanol to the combined methyl acetate-acetyl chloride fraction recovered from a previous run. The small percentage of the dichlor compound in the chloroacetyl chloride is attributed to the use of a rather high excess of chlorine rather than to the use of recovered ester.

By way of comparison with the above examples, the following diluents were used in batchwise preparations of chloroacetyl chloride, the figures denoting the percentage by weight of the dichlor compound found in the chloroacetyl chloride fraction.

| | |
|---|---|
| Carbon tetrachloride | 33–34 |
| Light petroleum (boiling range 60°–80° C.) | 16 |
| Acetyl chloride | 21 |
| Chloroacetyl chloride | 15–17 |

Diisopropyl ether was also tried out but, although the corresponding figure was only 5%, the yield of chloroacetyl chloride was only half the yield of acetyl chloride. It is believed that the high conversion of ketene to acetyl chloride in this case was caused by reaction with hydrogen chloride formed from chlorine attack on the diluent.

I claim:

1. In a process for the production of chloroacetyl chloride which comprises interacting chlorine and ketene, the improvement wherein the reaction takes place in the liquid phase in an alkyl acetate, the alkyl group of the latter containing less than 6 carbon atoms, whereby production of dichloroacetyl chloride is suppressed.

2. In a process for the production of chloroacetyl chloride which comprises interacting chlorine and ketene, the improvement wherein the reaction is carried out at a temperature between 20° and 30° C. in the liquid phase in an alkyl acetate, the alkyl group of the latter containing less than 6 carbon atoms, whereby production of dichloroacetyl chloride is suppressed.

3. In a process for the production of chloroacetyl chloride which comprises interacting chlorine and ketene, the improvement wherein the reaction takes place in the presence of a molar excess of the chlorine over the ketene, and wherein said reaction is carried out in the liquid phase in an alkyl acetate, the alkyl group of the latter containing less than 6 carbon atoms, whereby production of dichloroacetyl chloride is suppressed.

4. In a process for the production of chloroacetyl chloride which comprises interacting chlorine and ketene, the improvement wherein the reaction takes place in the liquid phase in an alkyl acetate, the alkyl group of the alkyl acetate containing less than 6 carbon atoms, whereby production of dichloroacetyl chloride is suppressed, a proportion of the alkyl acetate being produced by reacting the acetyl chloride formed as a by-product in the interaction of chlorine and ketene, after separation of the chloroacetyl chloride, with the corresponding alkanol.

5. In a process for the production of chloroacetyl chloride which comprises interacting chlorine and ketene, the improvement wherein the reaction takes place in the liquid phase in an alkyl acetate, the ratio of the alkyl acetate to the total reaction mixture being at least 0.4:1 by volume and the alkyl group of said alkyl acetate containing less than 6 carbon atoms, whereby production of dichloroacetyl chloride is suppressed.

6. In a process for the production of chloroacetyl chloride which comprises interacting chlorine and ketene, the improvement wherein the reaction takes place in the liquid phase in an alkyl acetate, the ratio of the alkyl acetate to the total reaction mixture being between 0.5:1 and 0.7:1 by volume and the alkyl group of said alkyl acetate containing less than 6 carbon atoms, whereby production of dichloroacetyl chloride is suppressed.

References Cited in the file of this patent

UNITED STATES PATENTS 2,697,115    Clower et al.    Dec. 14, 1954

FOREIGN PATENTS 735,902    Great Britain    Aug. 31, 1955